United States Patent
Decoteau et al.

(10) Patent No.: US 6,641,179 B1
(45) Date of Patent: Nov. 4, 2003

(54) MOBILE AIR CONDITIONING SYSTEM CONNECTION HAVING A CAPTURED O-RING

(75) Inventors: Ronald Allen Decoteau, Carnation, WA (US); Steven Jay Wierlo, Covington, WA (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 10/142,742

(22) Filed: May 9, 2002

(51) Int. Cl.$^7$ ................................................ F16L 37/14
(52) U.S. Cl. ........................ 285/379; 285/347; 285/353
(58) Field of Search ................................. 285/379, 380, 285/353, 918, 347

(56) References Cited

U.S. PATENT DOCUMENTS

| | | | |
|---|---|---|---|
| 2,131,509 A | * 9/1938 | Goepel et al. ............... | 285/347 |
| 3,438,657 A | 4/1969 | Torres | |
| 3,847,421 A | 11/1974 | Eschbaugh et al. | |
| 4,135,745 A | * 1/1979 | Dehar ........................ | 285/319 |
| 4,193,616 A | * 3/1980 | Sarson et al. ................ | 285/39 |
| 4,660,864 A | 4/1987 | Ershig | |
| 5,516,157 A | * 5/1996 | Williamson ................. | 285/212 |
| 5,540,463 A | 7/1996 | Potokar | |
| 5,803,512 A | * 9/1998 | Hollnagel ................... | 285/319 |
| 5,895,078 A | 4/1999 | Le Clinche | |
| 6,045,166 A | * 4/2000 | Krause ........................ | 285/347 |
| 6,149,206 A | * 11/2000 | DiRocco ..................... | 285/305 |
| 6,439,620 B1 | * 8/2002 | Guest ......................... | 285/347 |

* cited by examiner

*Primary Examiner*—Eric K. Nicholson
(74) *Attorney, Agent, or Firm*—Christensen O'Connor Johnson Kindness PLLC

(57) ABSTRACT

An improved fitting for mobile air conditioning systems is disclosed that reduces the risk of damage to fitting O-rings during assembly, the fitting male member being compatible with the fitting female member of many existing fittings currently in service. In particular, the male fitting (152) is compatible with female fitting (72) that comply with the IMACA 305 Standard. The male fitting includes a circumferential bead (158) that engages the distal end of the female member, an intermediate tubular portion (155) that extends distally from the bead, a tubular pilot portion (156) that extends distally from the intermediate portion, and a retainer bead (157) disposed between the intermediate and pilot portions. The retainer bead is positioned to retain the O-ring (51) near the circumferential bead, without interfering with proper compression of the O-ring, and full insertion of the male member into the female member.

6 Claims, 5 Drawing Sheets

MOBILE AIR CONDITIONING SYSTEM CONNECTION HAVING A CAPTURED O-RING

FIELD OF THE INVENTION

The present invention relates to fittings and, in particular, to fittings for mobile air conditioning systems.

BACKGROUND OF THE INVENTION

Mobile air conditioning systems provide summertime comfort to millions of automobile drivers and passengers on the road. The air conditioning system typically circulates a refrigerant, applying work in a well-known thermodynamic cycle to remove heat from the refrigerant prior to circulating it into the passenger compartment of the vehicle. Circulating the refrigerant in and out of the vehicle and through the refrigeration system components requires many fittings that interconnect the components, typically through hoses and tubes. In a mobile air conditioning system, the fittings must be sufficiently robust to withstand the rigors present in the engine compartment of a moving vehicle, without loosening or otherwise enabling the refrigerant to leak from the system. The fittings must also be removable to permit the system to be appropriately maintained. Due to the dynamic, thermal, and chemical environment within the engine compartment, regular maintenance of the mobile air conditioning system is essential.

Many of the fittings used in mobile air conditioning systems, particularly those used in Class 8 trucks, comply with a standard published by the Standards Committee of the International Mobile Air Conditioning Association, Inc., the standard known in the industry as the IMACA 305 Standard. For purposes of the present disclosure, the term "IMACA 305 Standard" means the standard described in "IMACA Component Standard 305 Fittings and Tubing Details for Mobile Air Conditioning Systems," copyrighted 1997 by International Mobile Air Conditioning Association, Inc. The MACA 305 Standard defines a physical standard covering details for threaded connections and tube end forms for flare and O-ring type connections, as well as hose insert details for barb style fittings for mobile air conditioning systems.

FIG. 1 illustrates an exploded view of a typical fitting assembly 50 complying with the IMACA 305 Standard. The fitting assembly 50 includes a tubular male fitting member 52 that sealingly engages a female fitting member 72. The male fitting member 52 (see IMACA 305, FIG. 7A, Option 1) includes a tubular proximal portion 54, a tubular distal or pilot portion 56, and a circumferential bead 58 disposed between the proximal portion 54 and the pilot portion 56. A swivel nut 60 slidably engages the proximal portion 54 and is restrained from sliding off the distal end of the pilot portion 56 by the circumferential bead 58. The swivel nut 60 comprises a conventional hexagonal portion 62 with a threaded orifice having an inside diameter greater than the diameter of the circumferential bead 58, so that the threaded portion can slide over the circumferential bead 58 and a smaller diameter neck portion 64 that engages the circumferential bead 58 when the fitting assembly 50 is properly assembled.

The female fitting 72 shown in FIG. 1 (two-piece construction shown; a rigid, one-piece construction is also acceptable per IMACA 305 Section 5) includes a tubular proximal portion 74, a tubular intermediate portion 75 having an inside diameter selected to slidably receive the male fitting pilot portion 56, and a tubular distal portion 76 having an inside diameter that is larger than the intermediate portion 75 to accommodate an O-ring 51 between the pilot portion 56 and the distal portion 76. A swivel nut 80 having outer threads 83 adapted to engage the male fitting swivel nut 60, is slidably disposed on the proximal portion 74 and retained from sliding over the distal end of the female fitting 72 by the intermediate portion 75 and/or the distal portion 76. The swivel nut 80 includes a conventional hexagonal portion 82 to facilitate installation and disengagement of the fitting assembly 50. The O-ring 51 is provided between-the male fitting 52 and the female fitting 72 to substantially seal the connection when the fitting assembly 50 is properly assembled.

FIG. 2 presents a partially cut-away view of the assembled fitting assembly 50. It will now be appreciated that fitting assembly 50 is releasably engaged by inserting the pilot portion 56 of the male fitting 52 into the distal portion 76 of the female fitting 72 and into the intermediate portion 75. The IMACA 305 Standard defines the pilot portion's 56 outside diameter as nominally 0.001 inch smaller than the nominal inside diameter of the intermediate portion 75. The male fitting 52 is inserted into the female fitting 72 until the circumferential bead 58 abuts against the distal portion 76 of the female fitting 72. The O-ring 51 in the assembled fitting 50 is compressed between the pilot portion 56 and the female fitting 72 distal portion 76. The swivel nuts 60, 80 are engaged to bring and hold the male and female fittings 52, 72 tightly together.

The O-ring 51 provides a seal between the female fitting 72 and the male fitting 52 to prevent the leakage of refrigerant from the connection. The region between the male fitting 52 and female fitting 72 that receives the O-ring 51, is frequently referred to as the O-ring "gland" and is detailed in isolation in FIG. 3. The gland 65 is shown with the O-ring 51 in phantom. It is now clear that the distal portion 76 of the female fitting 72 is larger in diameter than the intermediate portion 75 in order to accommodate the O-ring 51. To achieve an optimal and reliable sealed connection, the O-ring 51 must be compressed in the gland 65 a suitable amount such that a seal is produced against both the inner surface of the distal portion 76 and the outer surface of the pilot portion 56.

It is also noted that the fitting depicted in FIGS. 1—3 is defined in various sizes in the IMACA 305 Standard and with various pilot portion 56 lengths, the two-dimensional size of the gland region shown in FIG. 3 is generally the same for all of the defined connection sizes. In particular, the width of the O-ring aperture between the female fitting distal portion 76 and the male fitting pilot portion 56, denoted as W in FIG. 3, is nominally 0.135 inch (per IMACA 305, FIG. 5B, Table 5B), and the corresponding depth, denoted as D in FIG. 3, is nominally 0.0445 inch (derived from dimension in IMACA 305, FIG. 5B, Table 5B) (the distal portion 76 is nominally flared 5°, denoted as angle A in FIG. 3, so the depth varies slightly across the width).

Although the illustrated fitting assembly 50 utilizes a two-piece female fitting 72 (including the swivel nut 80), many straightforward alternative configurations;are utilized in the industry—including, for example, an alternative assembly described in the IMACA 305 Standard wherein a one-piece rigid female fitting is utilized with the interior of the nut portion of the female fitting having substantially the same geometry as the interior of the tubular portion of the female fitting 72 shown in FIG. 1., Similarly, although FIGS. 1 and 2 show an embodiment wherein the pilot portion 56 is smaller in diameter than the proximal portion 54, other configurations are possible, including, for example, configurations described in the IMACA 305 Standard wherein the pilot portion is larger in diameter than the proximal portion.

Although FIGS. 1 and 2 show the fitting assembly 50 in a horizontal orientation, in many applications the female fitting 72 is oriented vertically or at an angle of inclination, with the distal portion 76 facing upwardly. The vertically oriented fitting assembly 50 is assembled by bringing the male fitting 52 downwardly to engage the female fitting 72. In connecting the fitting assembly, the O-ring 51 is typically first lubricated with an appropriate lubricant and then slid over the pilot portion 56 of the male fitting 52 until it is adjacent the circumferential bead 58. The male fitting 52 is then inverted and inserted into the female fitting 72. In actual practice, it has been found that during such assemblies, the O-ring 51 frequently slides downwardly during the assembly process, which can result in loss or damage to the O-ring 51 during assembly. Moreover, damage or loss of the O-ring 51 may not be apparent during the installation, particularly in the common situation wherein the fitting assembly is in a location having relatively limited access. Damage or loss of the O-ring 51 is very undesirable because, if the joint is not properly sealed, then the refrigerant can escape from the air conditioning system, preventing the air conditioner from operating properly and releasing refrigerant into the environment. It will also be readily apparent that even in horizontally-oriented connections, the male fitting 52 may be inverted temporarily during assembly, permitting the O-ring 51 to slide toward the distal end of the pilot portion 56 and resulting in similar loss or damage to the O-ring 51.

Other fitting assemblies have been designed for mobile air conditioning systems that are intended to avoid or overcome the risks associated with loss or damage to the O-ring—including, for example, fittings utilizing flanged joints, grooved pilot tubes, and/or bonded washer joints. These alternative fittings, however, are not compatible with the many existing IMACA 305 Standard compliant fittings in service on existing automobiles, and therefore may require expensive retrofitting of existing equipment in order to implement. Additionally, such alternative designs are typically more difficult to assemble, and may require special tooling to assemble.

There remains a need, therefore, for an improved mobile air conditioning fitting that reduces the risk of damage or loss of the O-ring and that is compatible with the fittings on existing equipment.

SUMMARY OF THE INVENTION

An improved fitting for mobile air conditioning systems is disclosed that reduces the risk of loss or damage to the O-ring while maintaining compatibility with the large number of existing equipment currently in service. The improved fitting also connects in the same way as existing prior art connections so no new training or tools are required. Fittings for mobile air conditioning systems typically comprise a male member and a female member, the male and female members defining a gland therebetween for accommodating an O-ring, in order to provide a sealed connection. The O-ring is placed around the fitting male member prior to assembly and the male member is inserted into the female member and tightened using mating-threaded members to form a tight connection. In prior art fittings, the O-ring can slide along the male member, which can lead to loss or damage to the O-ring and subsequent leakage of refrigerant. In the present invention, a retainer bead is formed on the male member to retain the O-ring in the proper position. The retainer bead is sized and positioned to retain the O-ring without interfering with proper compression of the O-ring, and without interfering with the full assembly of the male and female members.

In an embodiment of the present invention, the retainer bead has a height between about 0.013 inches and 0.017 inch, a width between about 0.0471 inch and 0.0477 inch, and spaced axially from the circumferential bead between about 0.102 inch and 0.106 inch.

In another embodiment of the present invention, the retainer bead has a height of about 0.015 inch, a width of about 0.0474 inch, and is spaced axially from the circumferential bead by about 0.104 inch.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 5:
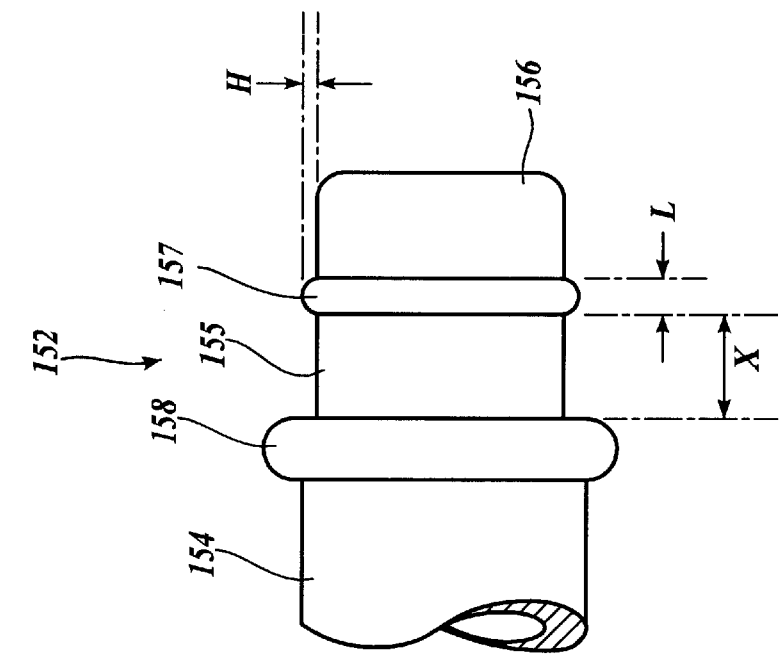
FIG. 5 is a close-up, fragmentary side view of the distal portion of the male fitting member shown in FIG. 4.
Figure 4:
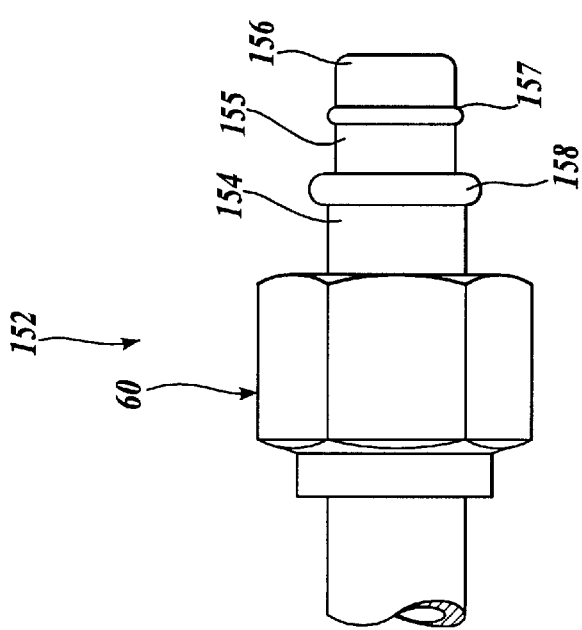
FIG. 4 is a side view of a male fitting member according to the present invention, the male fitting member being connectable to the female fitting member shown in FIG. 1.

The present invention will now be described with reference to the figures, wherein like parts have like numbers. Referring now to FIGS. 4 and 5, a male fitting 152 in accordance with the present invention is shown in a side view. The male fitting member 152 may be attached or formed integrally with, for example, a hose or pipe 90 for a mobile air conditioning system. The male fitting 152 includes a tubular proximal portion 154, a large circumferential bead 158 that extends radially outwardly from the distal end of the proximal portion 154, a tubular intermediate portion 155 extending distally from the circumferential bead 158, a smaller retainer bead 157 that extends radially outwardly from the distal end of the intermediate portion 155, and a tubular distal portion 156. A swivel nut 60 is slidably disposed about the proximal portion 154.

Figure 1:
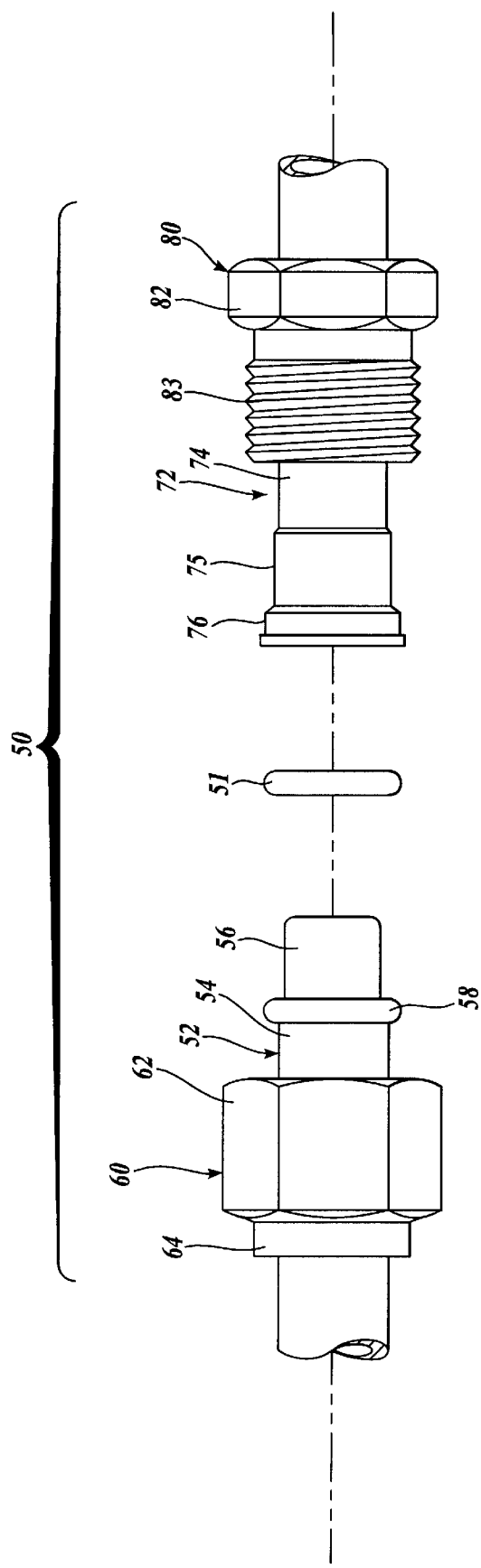
FIG. 1 is a side view of non-assembled prior art IMACA 305 Standard male and female fitting members.
Figure 2:
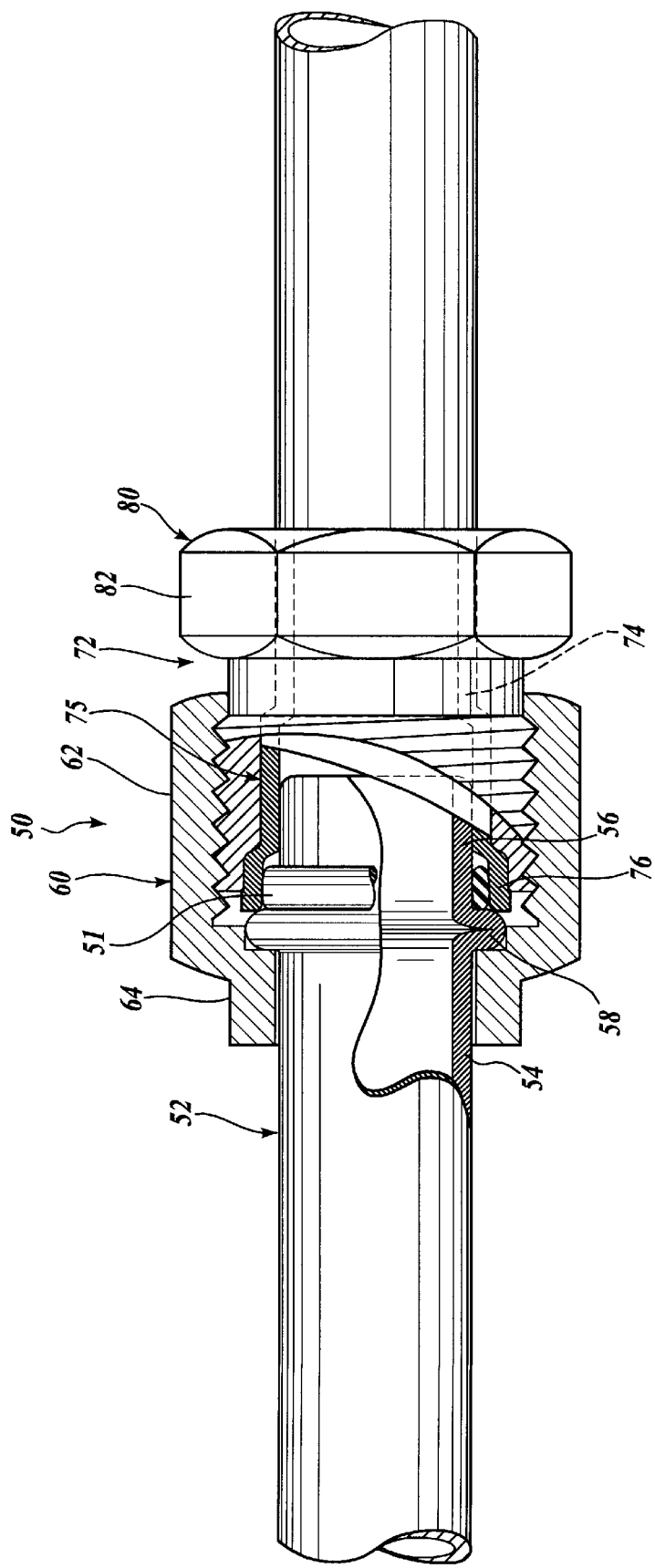
FIG. 2 is a partial break-away side view of the assembled prior art male and female fitting members shown in FIG. 1.
Figure 3:
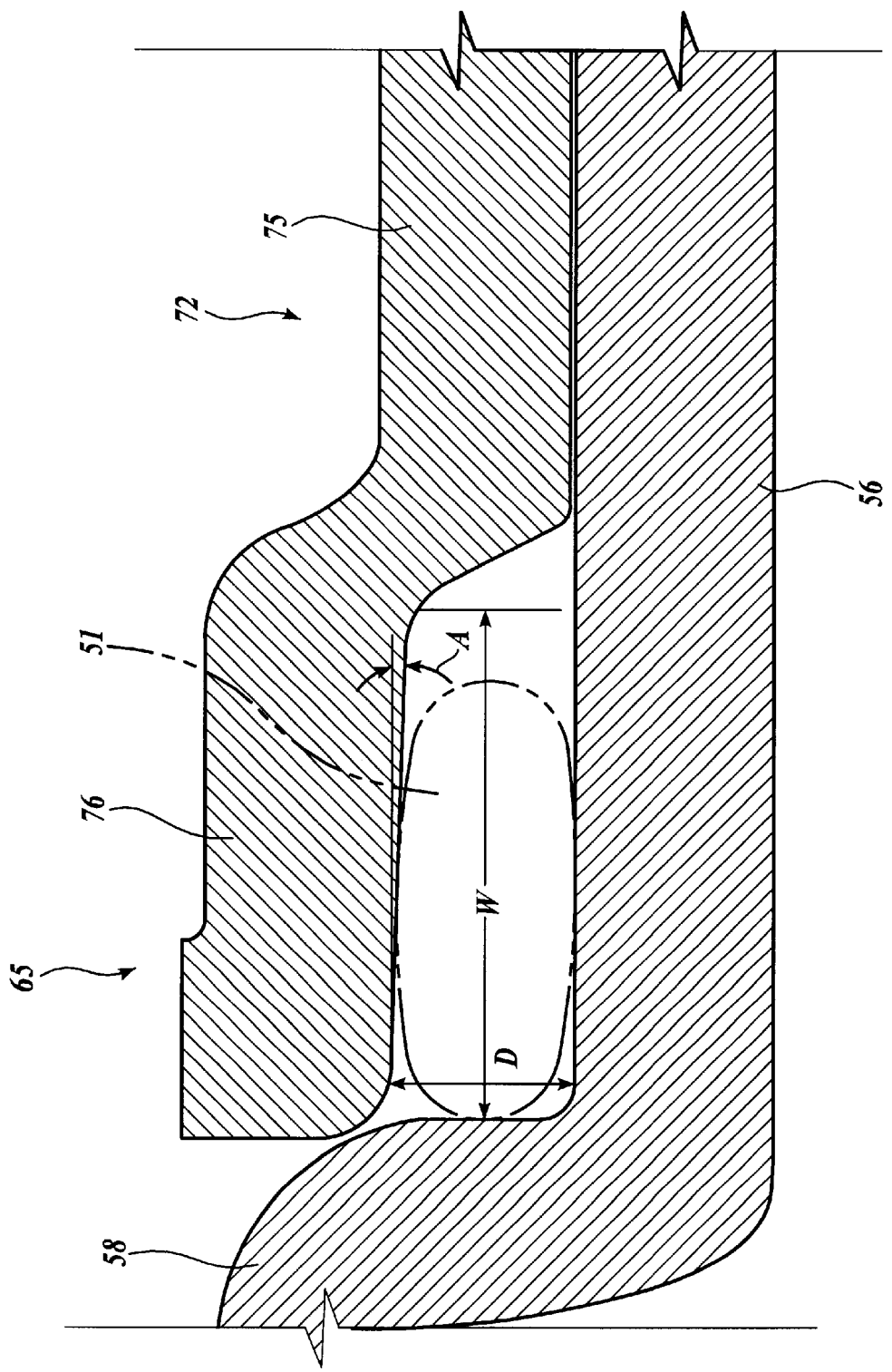
FIG. 3 is a close up cross sectional view of the O-ring gland portion of the fitting assembly, shown in FIG. 2.

It will be appreciated that a major portion of the proximal end of the male fitting member 152, including the swivel nut 60, the proximal portion 154, and the large circumferential bead 158, is generally the same as the corresponding proximal end of the male fitting 52 shown in FIGS. 1 and 2. In the preferred embodiment, this portion of the male fitting member 152 is fully compliant with the IMACA 305 Standard. Additionally, the distal end of the male fitting member 152 is generally the same as the corresponding distal end of the male fitting 52, shown in FIGS. 1 and 2, excepting the smaller retainer bead 157 that extends radially at the junction between the intermediate tubular portion 155 and the distal tubular portion 156.

The smaller retainer bead 157 functions to retain the O-ring 51 (FIG. 1) during assembly of the fitting assembly, preventing the O-ring 51 from sliding a significant distance away from the large circumferential bead 158, even when the male fitting member 152 is inverted, and thereby precluding loss or damage to the O-ring 51. A close-up view of the male fitting member 152 distal end is shown in FIG. 5. The retainer bead 157 of the preferred embodiment extends around the entire tubular distal portion 156, although it is also contemplated by the present invention that the retainer bead 157 might comprise a plurality of intermittent projections extending generally around the distal portion 156. The retainer bead 157 is located an axial distance X from the large circumferential bead 158, and has a height H that is less than the corresponding height of the circumferential bead 158, and an axial length L that is less than the corresponding length of the circumferential bead 158.

Figure 6:
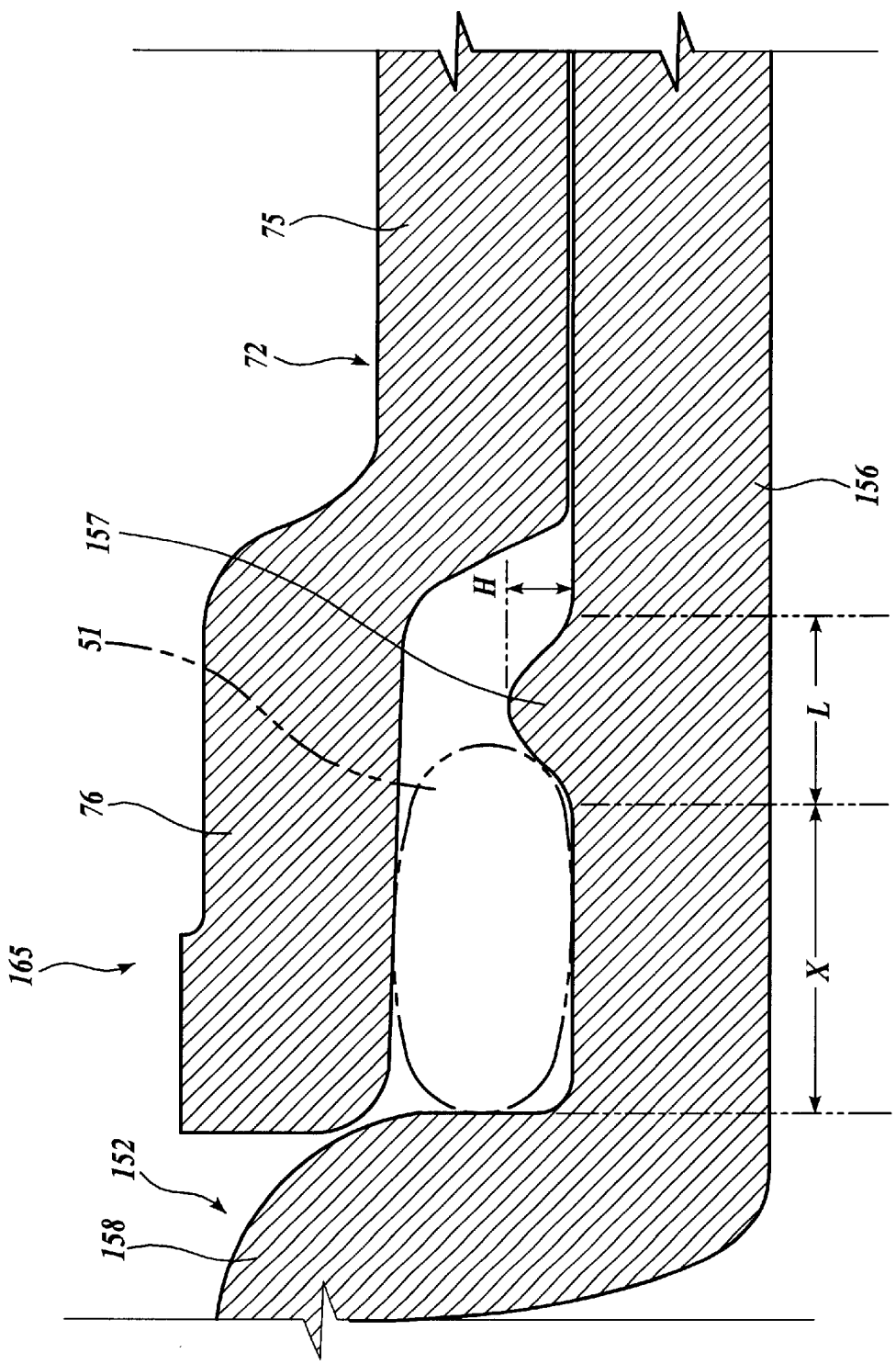
FIG. 6 is a close up cross sectional view of the O-ring gland portion of a fitting assembly, using the male fitting member shown in FIG. 4.

As discussed above, it is desirable that the male fitting member 152 be compatible with IMACA 305 Standard female fitting members—such as female fitting 72 shown in FIGS. 1 and 2—that are currently in service. This compatibility will avoid the need for costly retrofitting of existing equipment. A gland portion 165, showing the O-ring engagement region of a male fitting member 152 connected with a prior art female fitting member 72, is shown in FIG. 6. Compatibility with existing IMACA 305 Standard female fitting members presents several constraints on the location and size of the retainer bead 157. For example, the retainer bead 157 must be a distance X from the large bead 158 that is sufficiently large to accommodate the O-ring 51, but close enough to not interfere with the intermediate portion 75 of the female fitting member 72 during assembly. Importantly, the dimensions and location of the retainer bead 157 must not interfere with the desired deformation of the O-ring 51, which is compressed by the fitting to form the seal. The compression of the O-ring 51 results in a radially narrower, axially longer, cross-section. Interference with proper O-ring compression can result in a leaky, i.e., unsealed, connection.

It has been found that a retainer bead 157 positioned a distance X between 0.102 inch and 0.106 inch from the large bead, and preferably about 0.104 inch, and having a width between 0.0471 inch and 0.0477 inch, and preferably about 0.0474 inch, with a height between 0.013 inch and 0.017 inch, and preferably about 0.015 inch, does not interfere with proper compression, and therefore sealing, of the O-ring 51. This retainer bead geometry also does not interfere with the full insertion of the male member 152 into the female member 72, when the female member 72 is compliant with the IMACA 305 Standard.

The male fitting member 152 may be formed using any convenient method as is well known in the art. In a preferred method of construction, the male fitting member 152 is formed from a suitable tubular material by clamping the tubular material and using, an end former, such as an axial punch, to form the larger circumferential bead 158. A roller is then used to form the retainer bead 157. It is noted that utilizing a roller to form the retainer bead 157, rather than an axial punch process, reduces the likelihood that longitudinal scratches will be produced on the outer surface of the pilot portion 156, and therefore reduces the risk of forming potential refrigerant leakage paths. The formed and rolled fitting may then be coated with, for example, zinc, and finished to produce a smooth fitting.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An improved mobile air conditioning male fitting of the type having a pilot portion that extends distally from a circumferential bead and that is compatible with existing female fittings, the improvement comprising a retainer bead disposed on the pilot portion, the retainer bead having a size and position such that it does not interfere with compression of an O-ring disposed on the pilot portion adjacent the circumferential bead, and does not interfere with full insertion of the male fitting into the female fitting;

wherein the retainer bead has a height between about 0.013 inch and 0.017 inch, a width between about 0.0471 inch and 0.0477 inch and spaced axially from the circumferential bead between about 0.102 inch and 0.106 inch.

2. The improved male fitting of claim 1, wherein the retainer bead has a height of about 0.015 inch, a width of about 0.0474 inch, and is spaced axially from the circumferential bead by about 0.104 inch.

3. The improved male fitting of claim 2, wherein the retainer bead is a continuous circumferential bead about the pilot portion of the male fitting.

4. A fitting for mobile air conditioning systems comprising a female member having a tubular distal portion with an inside diameter and a male member having a tubular pilot portion with an outside diameter and a circumferential bead, the distal portion, the pilot portion, and the circumferential bead defining a gland for compressively accommodating an O-ring, wherein the pilot portion further comprises a retainer bead disposed distally from the circumferential bead, the retainer bead sized and positioned to retain the O-ring near the circumferential bead during assembly without interfering with compression of the O-ring and without interfering with fully inserting the male member into the female member;

wherein the retainer bead has a height between about 0.013 inch and 0.017 inch, a width between about 0.0471 inch and 0.0477 inch, and spaced axially from the circumferential bead between about 0.102 inch and 0.106 inch.

5. The fitting of claim 4, wherein the retainer bead has a height of about 0.015 inch, a width of about 0.0474 inch, and is spaced axially from the circumferential bead by about 0.104 inch.

6. The fitting of claim 5, wherein the retainer bead is a continuous circumferential bead about the pilot portion of the male member.

* * * * *